UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

BROMINATED DYE.

SPECIFICATION forming part of Letters Patent No. 632,621, dated September 5, 1899.

Application filed May 9, 1899. Serial No. 716,146. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Coloring-Matters of the Anthraquinone Series, (for which applications have been filed in Germany November 3, 1898, No. B 23,655, and November 15, 1898, No. B 23,923, and in England April 17, 1899, No. 8,051,) of which the following is a specification.

In an application for Letters Patent, Serial No. 712,765, I have described the production of a tri-brominated derivative of 1.4'-diamido-anthraquinone. My present invention relates to the manufacture of coloring-matters from this product.

In order to obtain the said coloring-matters, the tri-brominated derivatives are heated, together with an aromatic amin, with or without the addition of a diluent or solvent. The heating is continued until the production of coloring-matter is complete. As a rule the end of the reaction can be observed in that the melt no longer changes color. On cooling the coloring-matters crystallize out and can, if a liquid amin or diluent has been used, generally be directly collected by the filtering. Otherwise solidified melts are worked up by extraction with alcohol or similar solvent in which the amin is more readily soluble than the coloring-matter, or the coloring-matter melt can in any case be treated with dilute acids and in this way the coloring-matter separated from the amin; but when this method is adopted the coloring-matter is usually less pure than when obtained by the methods already mentioned.

The new coloring-matters in the form in which they are obtained from the melt with the aromatic amin are in general not directly applicable to practical dyeing on account of their insufficient solubility in water; but they can be readily converted into the form of their sulfoacids by treatment with sulfonating agents, such as concentrated sulfuric acid, fuming sulfuric acid, chlor-hydrine-sulfuric-acid, mixtures of sulfuric-acid with boracic acid or metaphosphoric acid with or without the addition of kieselguhr, and so on. In this form the new coloring-matters have the generic property of dyeing unmordanted wool and wool that has been mordanted with chrome, yielding shades that are of a blue to green-blue color. A similar result is obtained if the unmordanted wool be dyed from the acid bath and subsequently treated with chrome mordant.

In the present application for Letters Patent I desire to claim generically the new coloring-matters herein described, whether in the sulfonated or unsulfonated form, and specifically I desire to claim that dye which results from the use of anilin with the tri-brominated derivative of di-amido-anthraquinone.

My new series of coloring-matters are all characterized by the following properties: In the unsulfonated form they are soluble in anilin and nitro-benzene, giving blue, blue-green to green solutions, and in the soluble form of sulfoacids they are readily soluble in water, giving solutions of a blue color, which vary in shade according to the aromatic amin used in the manufacture of the coloring-matter. They are further characterized by containing bromin and on reduction with zinc-dust and glacial acetic acid yield yellowish leuco compounds. The coloring-matter obtained when using anilin in the melt, which I desire to specifically claim, is in the unsulfonated form soluble in anilin, giving a green-blue solution, and in nitro-benzene, giving blue-green solutions. It is hardly soluble in cold concentrated sulfuric acid, but gives a red-violet solution at 100° centigrade. In the sulfonated form it is readily soluble in water, giving a pure blue solution which shows practically no change in color on the addition of little caustic soda. It dissolves in concentrated sulfuric acid, giving a crimson-red solution.

The following examples will serve to illustrate the manner in which my invention can best be carried into practical effect. The parts are by weight.

*Example 1. Production of coloring-matter from tri-brom-diamido-anthraquinone and anilin.*—Mix together about ten (10) parts of the tri-brom derivative and about one hundred (100) parts of anilin. Heat the mixture slowly until it boils. The melt is at first red, but gradually and slowly changes to violet, to violet blue, and finally to a pure blue. Continue heating until the color of the melt remains unchanged. Allow the melt to cool down very slowly, so that twenty-four hours elapse before it reaches the ordinary temperature, and then let it stand a further twenty-four hours. When treated in this way, the coloring-matter separates out in steel-blue crystals. Filter, wash with alcohol, and dry.

*Example 2. Production of a coloring-matter from tri-brom-diamido-anthraquinone and para-toluidin.*—Mix together about ten (10) parts of the said tri-brom derivative and one hundred (100) parts of para-toluidin. Melt the mixture and heat it until it boils. Similar changes of color are observed to those described in Example 1 and the further treatment is the same, but the working up of the cold melt has to be effected in a different way. Powder the solidified melt roughly and boil it up with alcohol. The steel-blue crystals of the coloring-matter remain undissolved and can be separated in this way from para-toluidin.

*Example 3. Production of coloring-matter from tri-brom-diamido-anthraquinone and para-phenylene-diamin.*—Mix together ten (10) parts of the tri-brom derivative and one hundred (100) parts of para-phenylene-diamin and heat the mixture to a temperature of from 180° to 195° centigrade. Continue heating until a test portion of the melt dissolves in hot alcohol, giving a pure blue solution. When this point is reached run the melt into one thousand (1,000) liters of alcohol, stirring well all the time. Boil the mixture and then allow it to cool. The coloring-matter crystallizes out and can be separated by filtration from the alcoholic solution of para-phenylene-diamin. In this same way coloring-matters can be obtained using other aromatic amins, as instances of which I mention ortho-toluidin, benzidin, alpha- and beta-naphthylamin.

*Example 4. Conversion of the product of Example 1 into soluble sulfoacid.*—Mix about ten (10) parts of the said product with two hundred (200) parts of concentrated sulfuric acid (containing about ninety-six per cent. $H_2SO_4$) at ordinary temperature and stir the mixture without heating until a sample is soluble in hot water. Then pour the melt into water. A sulfoacid, which is difficultly soluble in cold dilute acid in large measure, separates out. Add common salt or chlorid of potash to complete the precipitation. Filter and dry. In the same way sulfoacids can be obtained from the coloring-matters resulting from the use or ortho- and para-toluidin instead of anilin.

*Example 5. Production of sulfoacid of the coloring-matter from tri-brom-diamido-anthraquinone and beta-naphthylamin.*—Add about ten (10) parts of the said coloring-matter to about two hundred (200) parts of concentrated sulfuric acid, (containing about ninety-six per cent. $H_2SO_4$.) Stir the mixture and heat to a temperature of about 60° to 70° centigrade until a sample of the product is soluble in water. Then pour the melt into water, precipitate the sulfoacid with common salt or chlorid of potash, and collect by filtration. In similar ways the other coloring-matters can be converted into their soluble sulfoacids. As aforesaid, the sulfoacid thus obtained dyes unmordanted wool and also wool that has been mordanted with chromate, giving blue to green-blue shades. If desired, unmordanted wool can be first dyed from the acid-bath and be treated subsequently with the metallic mordant.

Now what I claim is—

1. The new coloring-matters which can be obtained from tri-brominated-amido-anthraquinone and an aromatic amin and which contain bromin and in the unsulfonated form are soluble in anilin and nitro-benzene, giving blue, blue-green to green solutions, and in the form of sulfoacids are readily soluble in water, giving solutions of a blue color, and on reduction with glacial acetic acid and zinc dust yield yellowish leuco compounds, all substantially as described.

2. The new coloring-matter which can be obtained from tri-brominated-amido-anthraquinone and anilin, and which contains bromin and in the unsulfonated form is soluble in anilin giving a green-blue solution and in nitro-benzene giving a blue-green solution, and is hardly soluble in cold concentrated sulfuric acid, but gives a red-violet solution when heated, and in the sulfonated form is readily soluble in water, giving pure blue solutions which show practically no change in color or on the addition of a little caustic soda, and which is soluble in concentrated sulfuric acid giving crimson-red solutions, and yields yellowish leuco compounds on reduction with zinc-dust and glacial acetic acid, substantially as described.

In testimony whereof I have hereunto set my hand in the presence of two subscribing witnesses.

OSCAR BALLY.

Witnesses:
GUSTAV LICHTENBERGER,
ADOLPH REUTLINGER.